Dec. 8, 1931.   G. E. WEST   1,835,252
CREAM SEPARATING DEVICE
Filed July 7, 1930   2 Sheets-Sheet 1
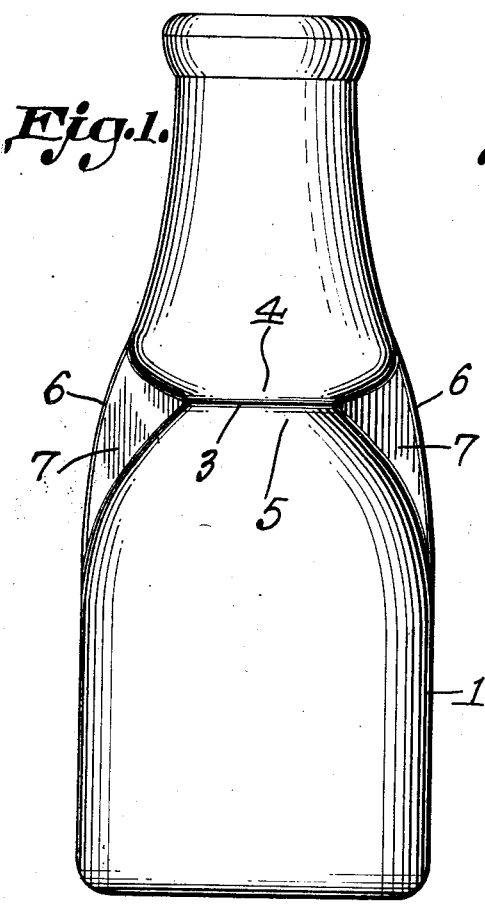
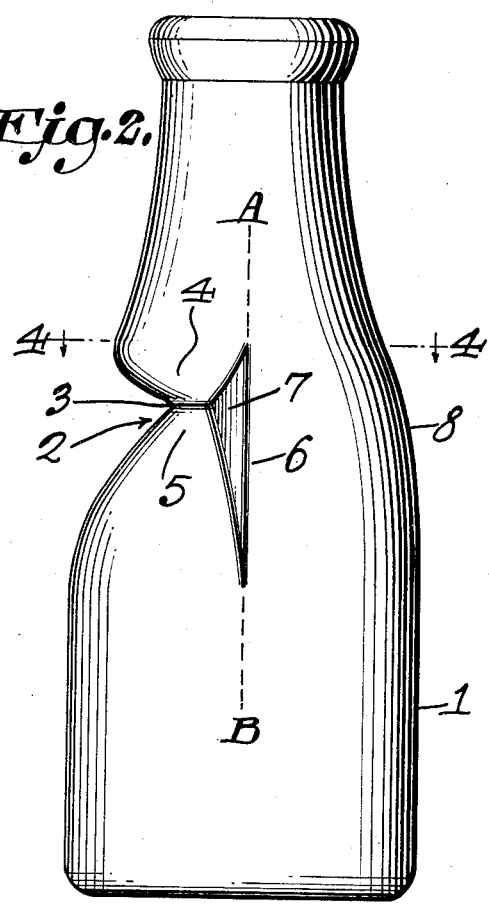
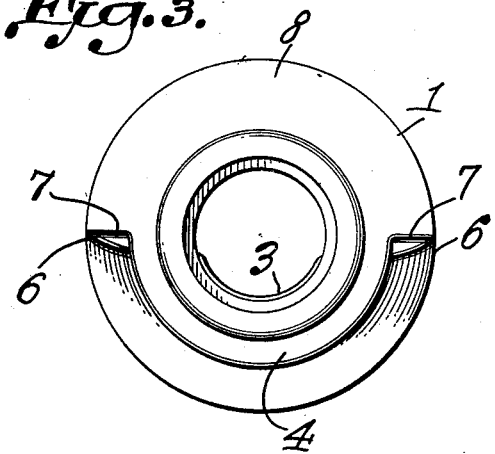
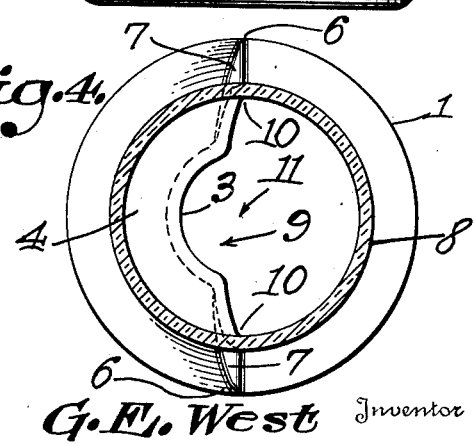
G. E. West  Inventor
By C. A. Snow & Co.
Attorneys.

Dec. 8, 1931.  G. E. WEST  1,835,252
CREAM SEPARATING DEVICE
Filed July 7, 1930    2 Sheets-Sheet 2
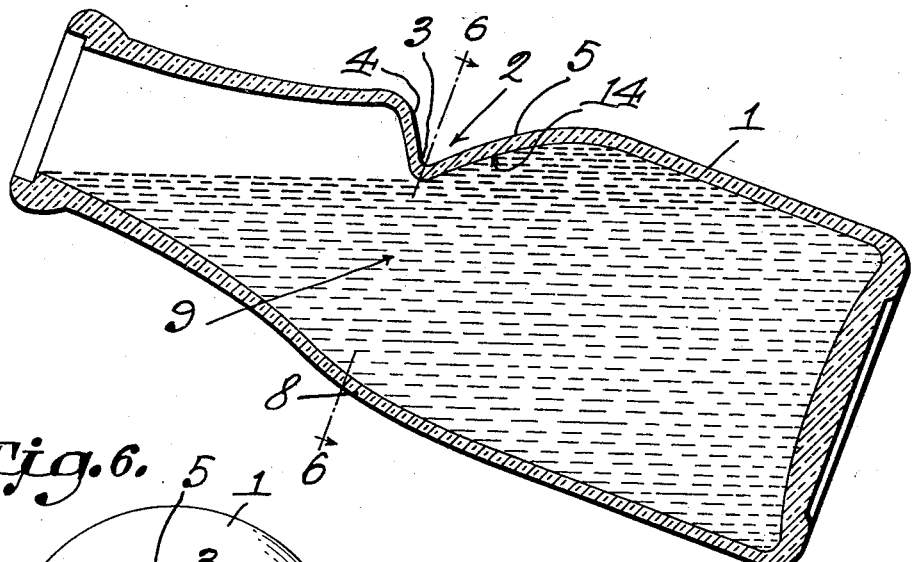
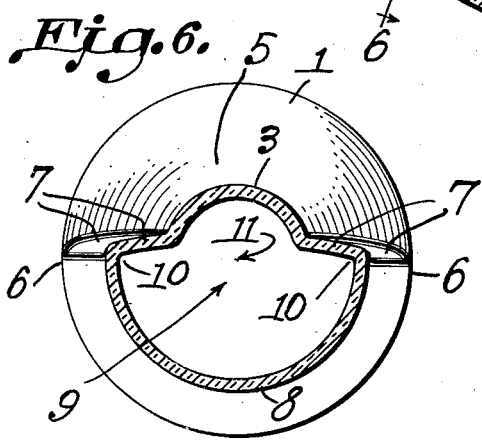
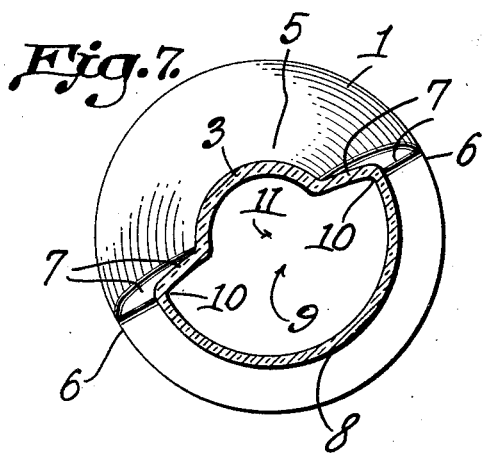
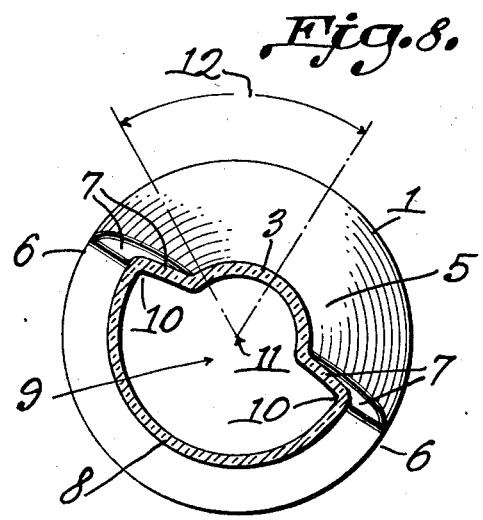
G. E. West  Inventor Patented Dec. 8, 1931

1,835,252

UNITED STATES PATENT OFFICE

GEORGE E. WEST, OF DALLAS, TEXAS, ASSIGNOR TO DAVE METZGER, OF DALLAS, TEXAS

CREAM SEPARATING DEVICE

Application filed July 7, 1930. Serial No. 466,291.

This invention aims to provide a novel means whereby cream may be separated from milk, the structure being embodied in a milk bottle which, aside from the features which characterize the invention, is more or less of conventional design.

A milk bottle which is to be effective from all points of view must embody not merely a means for separating the cream from the milk, when the bottle is tilted to pour off the cream. Other considerations have to be borne in mind. For instance, the bottle must be capable of manufacture by known processes which are commercially recognized. Again, the bottle must be capable of being cleaned on standard machines provided for cleansing bottles wholesale. The bottle must be economical as to the amount of material that goes into it, and it must be so constructed that it will be strong, presenting no spindling portions where a break is likely to occur. Furthermore, the bottle must be so constructed that, when it is tilted to pour off the cream, a satisfactory separation of the cream from the milk can be effected, even though the bottle be turned a trifle on its longitudinal axis.

The present invention aims to provide a bottle which will possess the before-mentioned characteristics, and the invention has among its objects to improve generally and to enhance the utility of devices of that type to which the invention appertains.

With the foregoing and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:

Figure 1 shows in elevation, a device constructed in accordance with the invention;

Figure 2 is an elevation herein the structure is viewed at right angles to the showing of Figure 1;

Figure 3 is a top plan;

Figure 4 is a section on the line 4—4 of Figure 2;

Figure 5 is a longitudinal section wherein the bottle has been tilted to pour off the cream;

Figure 6 is a cross section on the line 6—6 of Figure 5;

Figure 7 is a cross section on the line 6—6 of Figure 5, the bottle having been turned counterclockwise, on its axis, from the position of Figure 6;

Figure 8 is a section on the line 6—6 of Figure 5, the bottle having been turned on its axis clockwise from the position of Figure 6.

The cream separating device forming the subject matter of this application embodies a milk bottle 1, made of any desired material, such as glass, and, aside from the improvements hereinafter described specifically, the bottle is of a standard and approved form, which will be readily recognized by anyone.

The milk bottle 1 is dented inwardly at one side only, as shown at 2, to form a reduced neck 3. The neck 3 and those portions 4 and 5 of the bottle which lie, respectively, immediately above and immediately below the neck 3, are joined to the outer wall 6 of the bottle by oppositely disposed longitudinal wings 7. The wings 7 are located in one half of the bottle, considered longitudinally, and are disposed adjacent to the median longitudinal plane A—B (Figure 2) of the bottle.

The neck 3 and the opposite side 8 of the bottle, taken with the wings 7, cooperate to define a reduced throat 9, as shown in Figures 6, 8, and 7. The wings 7 form angles 10 in the throat 9, on each side of the neck 3.

The bottle is rotatable in opposite directions, on its longitudinal axis, through an arc 12 of considerable extent before the angles 10 will rise high enough to admit air into the space 14 (Figure 5) behind the neck 3 and permit milk to flow out of the said space.

Suppose that the bottle is tilted to the position of Figure 5, to pour off the cream, the bottle being in the position of Figure 6. Suppose, also, that the wings were dispensed with, the curve indicated by the numeral 3 in Figure 6 extending outwardly on an unbroken arc, to the points at which the numerals 10 are applied. With such a construction, or with an equivalent construction, as soon as the bottle is turned upon its axis 11, through an arc however small, either clockwise or counterclockwise, as shown, respectively, in Figures 8 and 7, a bubble of air will pass backwardly behind the neck 3 into the space 14, and the milk will flow out, thereby mingling the milk with the cream before a maximum amount of cream has been poured off. It should be noted particularly that this is a hypothetical case and a hypothetical construction, differing from the one shown in the drawings and mentioned merely in order to bring out the advantages of the structure hereinbefore described and hereinafter claimed.

As a matter of fact, the bottle seldom is held, during the pouring operation, in the position shown in Figure 6. The person using the bottle is almost certain to turn the bottle on its axis 11 either counterclockwise, as shown in Figure 7, or clockwise, as shown in Figure 8. Even though the bottle be so turned, either counterclockwise or clockwise, the longitudinal wings 7 will prevent a bubble of air from passing backwardly beyond the neck 3 into the space 14 of Figure 5, until the angles at 10 have risen to the positions shown in Figures 7 and 8. The bottle, clearly, is rotatable in opposite directions on its longitudinal axis 11 through an arc 12 of considerable extent before the angles 10 will rise high enough to admit air into the space 14 behind the neck 3 and permit milk to flow out of the space 14.

Owing to the fact that the neck 3 is not dented in at 2 to any great extent, it is possible to get at the entire interior of the bottle on a standard cleaning machine, to render the bottle fit for refilling, and any bottle depending upon a thin transverse partition, equipped with a small hole, or upon an equivalent construction, will be absolutely useless in practical operation because such a bottle cannot be cleaned. Because the bottle is dented in at one side only, as shown at 2, the opposite side 8 of the bottle remains intact and of standard construction, and, referring particularly to Figure 2, it will be seen that between the parts 3 and 8 there is no spindling neck, at which the bottle can be broken off. The wings 7 not only have the function hereinbefore attributed to them, but, as well, they afford finger holds for the bottle, so that the bottle can be gripped conveniently at a point well below the upper end of the bottle, it being practically impossible for the bottle to slip out of the grip of the user.

Having thus described the invention, what is claimed is:

In a cream separating device, a milk bottle which is dented inwardly at one side to form a reduced neck disposed about the longitudinal axis of the bottle in substantially concentric relation thereto; the neck, and those portions of the bottle which are immediately above and immediately below the neck, being joined to the outer wall of the bottle by oppositely disposed longitudinal wings located adjacent to the median longitudinal plane of the bottle and forming an external finger hold for the operator; the neck, the opposite side of the bottle and the wings cooperating to define a reduced throat, the wings forming angles in the throat on each side of the neck, the bottle being rotatable in opposite directions on its longitudinal axis through an arc of considerable extent before said angles will rise high enough to admit air into the space behind the neck and permit milk to flow out of said space.

In testimony that I claim the foregoing as my own, I have hereto affixed my signature.

GEORGE E. WEST.